United States Patent [19]
Schreiber et al.

[11] 3,876,543
[45] Apr. 8, 1975

[54] APPARATUS FOR PHYSICALLY AND BIOLOGICALLY PURIFYING SEWAGE

[76] Inventors: August Schreiber; Berthold Schreiber; Erhard Schreiber, all of Bahnhofstrasse 45, 3001 Hannover-Vinnhorst, Germany

[22] Filed: Aug. 27, 1973

[21] Appl. No.: 392,078

[30] Foreign Application Priority Data
June 25, 1973 Germany............................ 2332218

[52] U.S. Cl................................. 210/150; 210/272
[51] Int. Cl............................................. C02c 1/04
[58] Field of Search ............ 210/17, 150, 151, 272, 210/273, 271, 274

[56] References Cited
UNITED STATES PATENTS

| 379,349 | 3/1888 | Warren | 210/272 |
|---|---|---|---|
| 2,364,298 | 12/1944 | Kamp | 210/150 |
| 2,963,430 | 12/1960 | Schreiber | 210/17 |
| 3,292,788 | 12/1966 | Schwarz | 210/272 |
| 3,563,888 | 2/1971 | Klock | 210/150 |
| 3,587,975 | 6/1971 | Moffett | 210/272 |

Primary Examiner—Charles N. Hart
Assistant Examiner—Benoit Castel
Attorney, Agent, or Firm—Watson, Cole, Grindle & Watson

[57] ABSTRACT

A process and apparatus for physically and biologically purifying sewage. A combination filter-biofilter containing a bed of artificially aerated filler material is used. The sewage is preliminarily clarified and distributed evenly over the filler material and is caused to flow through the latter for a limited time until the sewage has coated the surfaces of the filler material with sludge and microorganisms to an extent that the passage of air through the filler bed is substantially decreased because of encrustation of the interstices of the filler material. At this point the flow of sewage through the filler material is halted and the bulk of the sludge is removed from the filler material by turning the same over with air. Then, the flow of sewage through the filler material is reinstituted. An abrasion resistent filler material is used and for purposes of turning-over the filler material, the bed of the latter is filled with water and the water and the filler material are turned over within the filter-biofilter by means of blown-in compressed air. At the same time the released sludge is drawn off. The turning-over of the filler material and water are accomplished gradually in a horizontal direction through the contents of the filter-biofilter.

15 Claims, 4 Drawing Figures

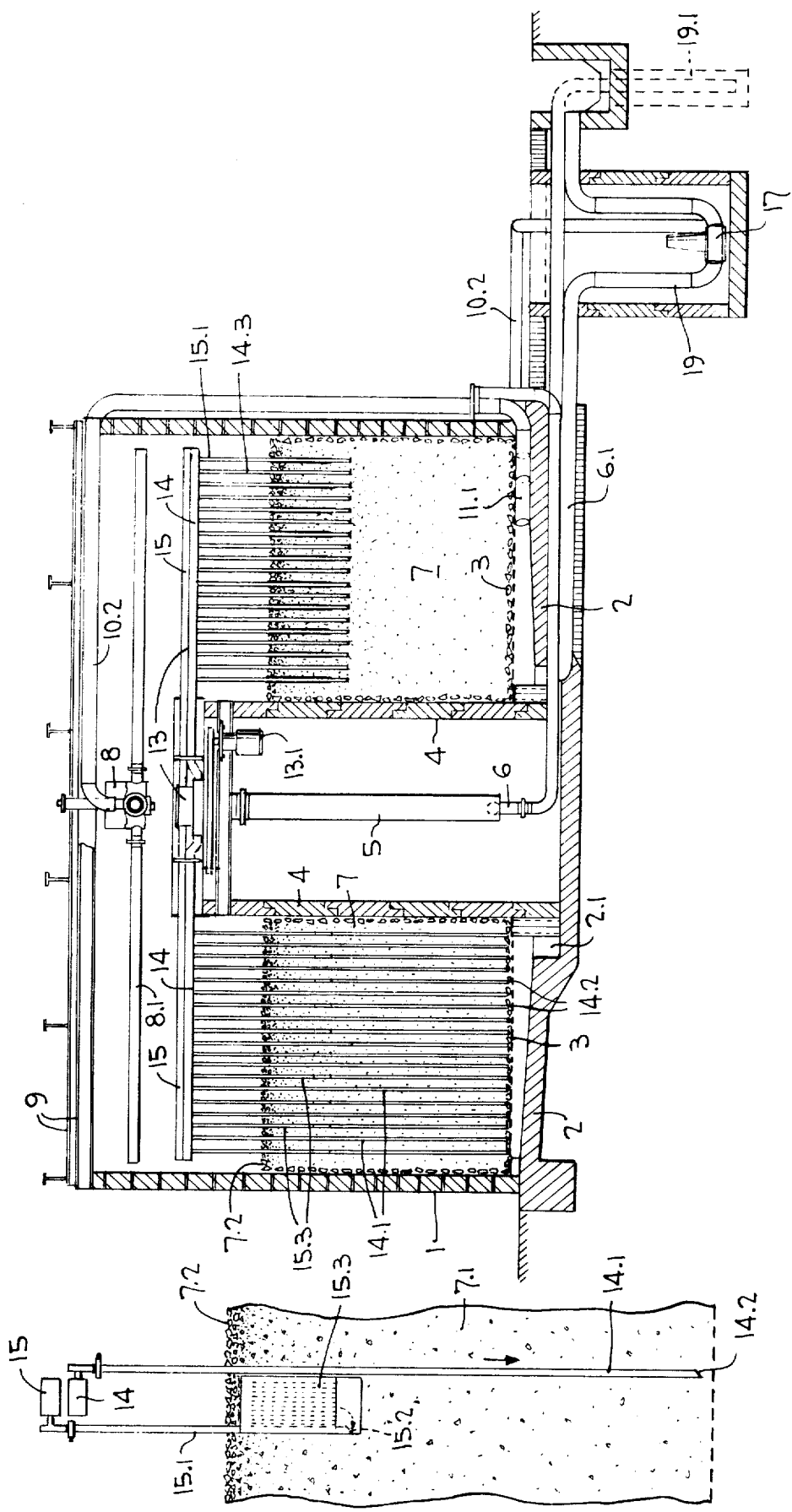

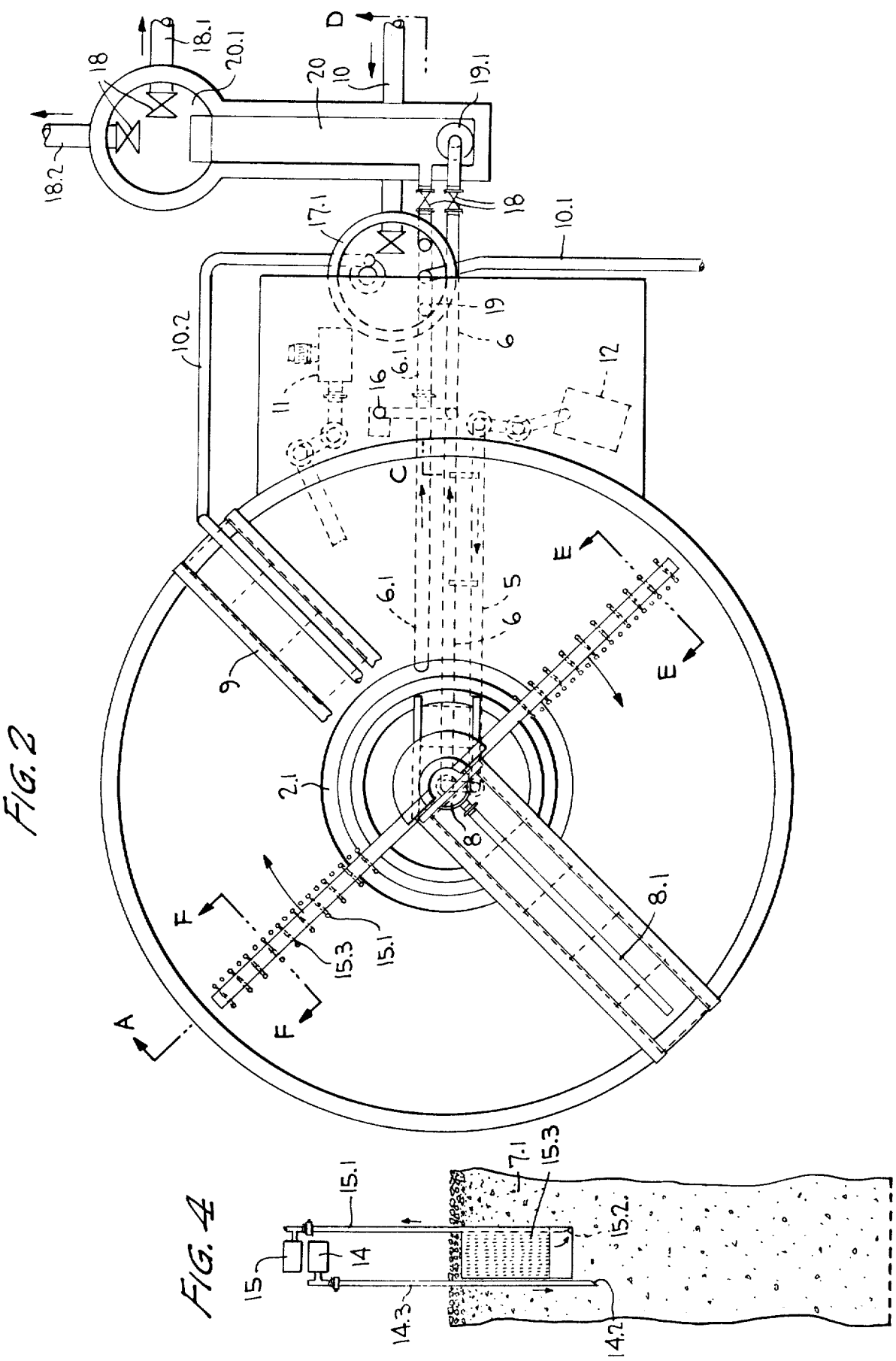

APPARATUS FOR PHYSICALLY AND BIOLOGICALLY PURIFYING SEWAGE

BACKGROUND OF THE INVENTION

1. Field Of The Invention:

The present invention relates to an apparatus for the physical and/or biological purification of sewage by means of a filter-biofilter, wherein mechanically prepurified sewage is distributed evenly over an artificially aerated filler material and is trickled through the latter. The trickling is continued for a limited time until the sewage has coated the surface of the filler material more and more with sludge and microorganisms whereby the passage of air through the filler has been decreased more and more because of the incrustation of the interstices of the filler material. Then the largest part of the excess sludge is withdrawn from the filler material by turning it over and subsequently the time-limited and repeated trickling of the sewage through the filler material is reinstituted again. An abrasion resistant filler material is used and for the purpose of turning over of the filler material the filter-biofilter is filled up with water, then the dammed up water and filler material is turned over within the filterbiofilter by blowing in of compressed air. At the same time the mineral or biological sludge, filler material and dammed up rising water are drawn off from the mixture of these items that is developing and afterwards the rinsing water is discharged.

2. Description Of The Prior Art:

Such a process has become known through the German published applications 2,116,000 and 2,150,345. This known process is carried out in such a way, that both the turningover and rinsing as well as the drawing off of sludge is accomplished only at certain places in the filter-biofilter, as a result of which a sufficient sludge removal from the filler material is achieved with relatively small biofilters, that is to say, biofilters having a diameter up to about 10 M, while in the case of larger biofilters with a diameter of for example about 20 M, only an incomplete sludge removal takes place, since in the available areas, which are not encompassed by the turn-over of the removal of sludge, pockets remain between the places at which both the turning over and rinsing, as well as the removal of sludge takes place. In the case of purification with clear water, such areas not encompassed by the turning-over and rinsing would be without any harmful effect on the purified clear water because of the purely mechanically accomplished purification and because of the bacteria-free minerals used thereby. In the case of biological purification of sewage constituting the starting point of the invention however, aa digestion occurs in the areas not encompassed by the turning-over and the rinsing in the sludge pockets, which on the one hand deteriorates the flow off from the filter-biofilter to an unadjustable extent and which on the otherhand causes a quick resludging of the filler material, as a result of which the purifying effect of the filter-biofilter is substantially decreased.

This is where the present invention starts, which is based on the task of providing for the physical and/or biological purification of sewage by means of a filter-biofilter, in which the filler material is desludged effectively in all its areas. For the solution of this task the proposal is made according to the invention, that the turning-over and removal of sludge is accomplished continuously in a horizontal direction right through the contents of the filter-biofilter. Effectively the progressive turning-over and removal of sludge is carried out continuously.

It has now been achieved that because of the continuously carried out turning-over and rinsing, all areas in the filler material are encompassed successively and as a result of which are desludged effectively. This process makes it possible that now the above mentioned large biofilters, as can be used in the case of large quantities of sewage obtained from several tens of thousands of inhabitants, can be highly loaded without the purification effect being impeded and without there being any necessity for a much too frequent desludging of the filler material. Basically the invention can also be used in the form of a filter-biofilters developed as a longitudinal basin.

Insofar, however, as the filter-biofilter is developed in a known manner in the form of an upright cylinder, the proposal is made according to the invention, that the progressive turning-over and desludging is accomplished in the sense of a rotational movement taking place around the center of the biofilter. The locally fixed desludging grates provided for the desludging of the biofilter in the filter-biofilters known by way of the above mentioned German published applications 2,116,000 and 2,150,345, the annular sludge removal pipes and the slanted sludge removal metal sheets, as well as the likewise locally fixed perforated rooflike superstructures and aerating pipes serving for the turning-over by means of compressed air and cooperating therewith, are to be sure sufficient in their effect for relatively small quantities of sewage. In the case of large quantities of sewage, as obtained from several tens of thousands of inhabitants, and which are to be purified with the acid of the above mentioned relatively large filter-biofilters, the desludging in the case of known filter-biofilters must however be carried out relatively often and each time over relatively large periods of time, since the turning-over and desludging effect is too insignificant and since pockets of sludge develop in the areas between the above mentioned desludging and turning-over arrangements, so that in this case the known filter-biofilters are unsuitable. Therefore a filter-biofilter for the carrying out of the proposed process is to be created by the invention, which can be produced in a sufficient size and while avoiding high expenditure and which desludges effectively and in a simple manner.

SUMMARY OF THE INVENTION

For this purpose the invention starts out from a filter-biofilter for the physical and/or biological sewage purification with some granulated filler material, which has essentially a specific grain weight of somewhat below 1 or around 1. The apparatus includes a rotary distributor having distributing arms for the even distribution of the mechanically pre-purified sewage above the filler material, a diverting arrangement for the purified sewage which has trickled through the filler material and a pipe for the aeration of the filler material disposed below a perforated floor grate. Thus, the biofilter container is compact and open on top and is provided, with arrangements for being filled to the top with water for the turning-over, by means of compressed air of a mixture consisting of dammed up water, filler material and sludge inside of the container for the biofilter. The apparatus also includes a discharge arrangement disposed in the area of the upper layers of the filler material for discharging of the excess sludge and the rinsing water. The arrangements for the turning-over of the above mentioned mixture comprise compressed air pipes leading into the filler material above the perforated bottom grate and the turning-over air is supplied at a higher pressure than the air for artifical aeration.

In the case of such a filter-biofilter, the proposal is made that the sludge removal arrangement, consists of at lease one sludge removal arm rotatable in a horizontal plane and mounted above the filter material in the middle of the container for the biofilter. This arm on the one hand is connected with a discharge pipe for excess sludge and on the other hand with sludge containers projecting into the upper layers of the filler material. The arrangements for the turning-over consist of at least one rinsing arm rotatable in a horizontal plane and mounted likewise in the center in the biofilter container above the filter material and this arm is on the one hand connected with a source for the compressed air for the turning-over air and on the other hand with rinsing pipes reaching into the filler material and provided at their larger ends with air outlet openings.

The granules of the filler material located in the preferably round container for the biofilter can at the same time have a grain size of below 6 mm. Thus a grain size of above 6 mm can also be used, especially in the upper layers of the filler materiaal.

The proposal according to the invention makes it possible that the sludge removing containers and the rinsing pipes are moved through the filler material dammed up with water into the neighborhood of the surface of the filter material. Thus, the compressed air emerging from the rinsing pipes moves in a whirling motion through the filter material lying above the air exit openings with the equally heavy water and the dammed up water, and it turns over the filler material and loosens the sludge from the grains of the filler material as well. At the same time however, such a low resistance develops for the rinsing pipes reaching possibly up to close above the perforated bottom grate, that the latter can revolve within the biofilter container at a low speed and thus separate continuously, section by section, the sludge from the entirety of the filler material located in the container.

The sludge removal containers ae effectively connected with the sludge removal arm by way of suction pipes extending downwardly from the sludge removal arm. These pipes have their lower ends developed as sludge entry openings and they reach into the sludge removal container. The latter are attached to the sludge removing arm with their suction pipes and are perforated at least on top in order to allow the sludge water to enter. In the lower area they constitute a closed spaced into which the pipes reach. As mentioned, the sludge separated from the grains of filler material is washed upwards through the rising compressed air of the rinsing pipes and enters into the perforated sludge removal containers developed in a manner of pockets and via the suction pipes and the sludge removal arm into the mechanical prepurification stage. In this manner, a desludging, which is economically intensive, can be carried out.

In the case especially of filter-biofilters under heavy load, it is recommended that the sludge removal arm and/or the rinsing arm extend from the central revolving bearing across the entire diameter of the biofilter container. This embodiment makes it possible that the filler material viewed across the width, that is to say the diameter of the biofilter container, will be moved through in a whirling motion in all areas by the compressed air escaping from the rinsing pipes and will be desludged by the sludge removal containers. In other cases it will be sufficient whenever the sludge removing arm and/or the rinsing arm extend from the central rotating bearing over the entire diameter of the biofilter container.

According to another embodiment and in certain cases, for example whenever turn-over air is fed in additionally through perforated rooflike superstructures, known per se, and disposed on the bottom of the container, the rinsing pipes starting out from the rinsing arm extend down to about half the level of the filler material instead of up to closely above the perforated bottom grate. In order that the upper layers of the filler materials too, in case of which a greater or quicker sludge accumulation takes place, be turned-over and desludged very intensively during the rotating movement of the rinsing arm, the proposal is made that the rinsing pipes, starting out from the rinsing arm, extend on the one half of the rinsing arm, starting out from the rotating bearing, extend down to closely above the perforated bottom grate and the rinsing pipes on the other half of the rinsing arm extend down to about half the level of the filler material. It can be sufficient whenever the mutual distance of the rinsing pipes is half as large or approximately half as large as the mutual distance of the sludge removal containers. With regard to making an unimpeded rotational movement of the sludge removing arm and the rinsing arm possible, it will be effective whenever the above mentioned arms are disposed below the distributor arms of the rotary distributor which has a feed pipe for mechanically purified sewage.

A further embodiment is characterized by the fact that in the supply pipe a etering arrangement is provided for the addition of lime slurry, aluminum sulfate, activated charcoal in a fine grain etc. In this manner, one will achieve in a simple way that the contents of phosphates, nitrogen or other substances harful for the receiving water is decreased or separated and eliminated along with the rest during the desludging.

The drive of the sludge removal and of the rinsing arms could per se take place from the drive of the rotary distributor, possibly by way of a suitable transmission. But in order to be independent of the rotary movement of the rotary distributor, the proposal is made that the sludge removal arm and the rinsing arm have a drive of their own, preferably in the form of an electric motor. At the same time, it will be sufficient, especially if the two above mentioned arms are connected firmly with one another, that there be a common drive for both arms.

An effective solution of the mounting and connecting problems for the two above mentioned arms which favors effective desluding and turning-over, consists in that the sludge removing arm is arranged above the rinsing arm and that both arms are connected firmly and are mounted rotatably as well by means of a rotational ball connection around two pipes arranged perpendicularly and concentrically with regard to one another on a central shaft disposed in the biofilter container. Both pipes are sealed against each other by means of slip ring seals, the inside pipe is connected with the sludge removing arm as a discharge pipe for the sludge-water mixture, and the outside pipe is connected with the rinsing arm as a supply pipe for the high pressure air, coming from the compressed air source.

The current supply cables, for example, for the electric motor driving the two above mentioned arms, can also still be arranged in the above mentioned central shaft.

Since the surface of the filler material and above all of the water level occurring during rinsing or turning-over in the biofilter container lies below the upper edge of the central shaft, a vacuum pump is built according to a further embodiment, into the discharge pipe for the excess sludge formed by the sludge-water mixture, through which vacuum pump the sludge-water mixture is siphoned over the upper edge of the central shaft to the discharge pipe located below the water level.

DESCRIPTION OF THE DRAWING

In the drawing, an embodiment of the filter-biofilter according to the invention is shown by way of example, which is explained subsequently in more detail.

FIG. 1 is an elevational cross-sectional view of a filter-biofilter taken substantially along the line A–B–C–D of FIG. 2;

FIG. 2 is a top plan view of the filter-biofilter with the operating gallery partially broken away, whereby the rotary distributor is shown with only one arm;

FIG. 3 is an elevational, cross-sectional view taken substantially along the line E—E of FIG. 2; and FIG. 4 is an elevational, cross-sectional view taken substantially along the line F—F of FIG. 2.

DETAILED DESCRIPTION OF THE PREFERRED EMBODIMENT:

The filter-biofilter consists essentially of a container 1, a concrete floor 2 with perforated bottom grate 3 disposed above it, a central shaft 4, through which passes a supply pipe 5 for high pressure air and a discharge pipe 6 for excess sludge and electric current supply cables. In the container 1 there is filler material 7 above which is a rotary distributor 8. The container 1 furthermore has an operating gallery 9, supply pipes 10 and 10.2 for mechanically cleaned sewage leading to the rotary distributor, an air compressor 11 for low pressure artificial aeration of the filler material 7, an air compressor 12 for the production of high pressure compressed air for the turning-over air connected to the supply pipe 5, a sludge removal arrangement 13 with rinsing arm 14 and sludge removal arm 15, a vacuum pump 16 built into the discharge pipe 6, a feed pump 17 built into the supply pipe 10 or 10.2, shifting and locking valves 18, a water purifier 19 for a discharge pipe 6.1, receiving the standard biofilter discharge, a visible channel 20 and a purififier 19.1 for a sludge-water mixture.

The mechanically pre-cleaned sewage is fed through the supply pipe 10 to the pump 17.1 of a pump 17, and from there it is pumped with the help of the feed pump 17 through the pressure pipe 10.2 into the rotary distributor 8 and is distributed by way of the rotary distributor arms 8.1 over the entire surface of the filler material, 7 located in the filterbiofilter. Simultaneously, low pressure air is blown in by air compressor 11 via pipe 11.1 between the perforated grate 3 and the bottom 2. The air is distributed below the entire perforated grate 3 and aerates the filler material 7 evenly. During passage of the sewage through the filter-biofilter, in which biological sludge develops as a result of the blown-in air, which absorbs the polluted matter of the sewage and converts it into sludge, the sludge is deposited on the surface of the grains of the filler material. Mechanical, non-organic substances are likewise developed on the surface of the filler material, so that the discharge is collected after passage through the perforated grate 3 on the bottom 2 and collects through portion 2.1 of the bottom 2, disposed centrally in the biofilter container. The discharge then reaches the discharge pipe 6.1 and the water purifier 19 and then the visible channel 20 during the standard operation free of sludge and flows off fully purified biologically. The discharge reaches the discharge-distributor shaft 20.1 through a micro-strainer and into the receiving water by way of the discharge pipe 18.2 leading to said receiving water, which is not shown, while the sluice valves are opened.

After a further deposit of sludge, inside the filler material 7, the side valve of the discharge pipe 18.2, leading to the pipe 18.1, which leads to the preliminary clarification stage, is opened.

The slide valve 18 of the discharge pipe 6.1 is closed and the feed pipe 10 coming from the preliminary clarification stage is opened, the feed pump 17 is started and additional rinsing water is fed in through pipe 10.1 for a quicker filling of the filler material 7.

Whenever the water level in the filler material 7 has risen up to its surface 7.2, additional water for rinsing is supplied via the rotary distributor 8, and the water level inside the filler material is kept at the same level by automatic control of the feed pump 17.

Now the compressor 12 is started and the compressed air produced is guided via the supply pipe 5 into the rinsing arms 14 and by way of rinsing pipes 14.1 having below air exit openings 14.2 and extending close to the container grate 3, up to the bottom 2 of the biofilter. As a result, the entire filler material 7 is stirred up in the area of the rinsing arm 14 with the superposed sludge removal arm 15 and the sludge is for the greatest part separated from the surface of the grains of the filler material. The compressed air, produced by the compressor 12 is forced at the same time through the rinsing pipes 14.1 into the filler material 7 at a greater pressure, than would correspond to the resistance of the filled up water column. The vacuum pump 16 is switched on which sucks off the air via the discharge pipe 16. As a result of this suction effect, the sludge-water mixture enters through the lower ends of suction pipes 15.1, each time developed as sludge intake openings 15.2 by way of pocketlike, preferably perforated sludge removal containers 15.3, and then reaches the sludge removal arm 15 and from there the discharge pipe 6. In the case of opened slide valves 18 of the discharge pipe 6, the sludge-water mixture reaches furthermore by way of the water purifier 19.1, the visible channel 20 and the distributor shaft 20.1 and from there via the opened slide valve 18 of the pipe 18.1, which leads to the preliminary clarification.

Then an electric motor 13.1 for the drive of the sludge drain-off arrangement 13 is switched on, as a result of which the sludge removal arm 15 and the rinsing arm 14 are put into slow revolving motion. The discharge of the sludge-sewage mixture from the sludge removal containers 15.3 into the preliminary clarification is brought about by siphoning the entire mixture from the containers 15.3 and by gradient existing up to the preliminary clarification. After a one time or repeated revolution of the sludge drain-off arrangement 13, the sludge is rinsed out of the filler material 7 and this in such a way that mesosaprobic sludge is washed out from the lower layers of the filler material upward and polysaprobic sludge of the upper layers 7.1 of filler material can enter directly into the sludge removal container 15.3. Thus a mixing of the polysaprobic microorganism of the upper layers of filler material 7.1 with the mesosaprobic microorganisms of the lower layers of filler material will not occur for practical purposes, so that in case of restarting operations the biological conditions of the filter-biofilter are not seriously disturbed.

The distance of the sludge suction pipes 15.1 is, according to FIG. 1, twice as great as that of the rinsing pipes 14.1. On the right hand side of the rinsing arm 14 in FIG. 1, the rinsing pipes, which there carry the reference number 14.3, extend only into the upper layers of filler material 7 (FIG. 4), so that the latter are more intensively desludge at the revolving movement of the sludge drain-off arrangement 13, than the lower layers of filler material.

After sufficient desludging, the electric motor 13.1 including the compressor 12 and vacuum pump 16 is turned off, and the discharge (run-off) passing through the perforated bottom grate 3 and consisting of previously fed-in impounded water and separated sludge, is drained off to the last residue into the preliminary clarification by opening of the slide valve 18 of the discharge pipe 6.1, leading from the sewage collection through 2.1 of the container bottom 2 via the water purifier 19 into the visible channel 20, and thus the entire filler material 7 is drained.

Then again as much sewage is fed to the rotary distributor 8 and thus to the filler material of the filter-biofilter by the feed pump 17 with simultaneous supply of air of low pressure through the pipe 11.1 that the biological purification starts again within the filter-biofilter, until the discharge draining off through the discharge pipe 6.1 has become free of sludge, which can be determined by measurements or visual inspection in the visible channel 20. The feed-in air of low pressure cannot in this case escape via the discharge pipe 6.1, since the latter is locked by a water purifier 19 against the passage of air to the receiving water.

Since a certain portion of the biological sludge still adheres to the grains of filler material, the biological purification and holding of the sludge within the filler material immediately occurs again, so that even after about 10 to 20 minutes a sludge-free and clear discharge will be achieved. Up to this time however, the partly still sludge-containing sewage is conducted to the preliminary clarification and, mixed with the remaining preliminary clarification, is fed once more to the filter-biofilter. Then the pipe 18.1 to the preliminary clarification is closed and the discharge pipe 18.2, leading to the receiving water, is opened for the normal run-off. Now, according to practical experience, sewage can be conducted for several days across the filter-biofilter and can be purified fully biologically. Only whenever the passage of water and air is considerably impeded as a result of accumulation of sludge in the interstices of the filter-biofilter will it be necessary again to start desludging in order to again desludge the filter-biofilter.

Let us still mention, that openings for passage of the perforated bottom gate 3 and the sludge removal container 15.3 are dimensioned such, that the sludge-water mixture can pass through but not the grains of filler material.

For the purpose of a continuous operation and of an equalization it will be of advantage to provide two filterbiofilters parallel beside each other for the duration of desludging, whereby the filter-biofilter which at the time is not desludged, equalizes the inflow and discharge to the entire filter-biofilter installations.

It will be effective to add chemicals, for example, calcium hydroxide, aluminum sulfate, etc., to the inlets to the filter-biofilters, in order to decrease the contents of phosphates and other substances which are harmful to the receiving water. Since the developed sludge of the filterbiofilter reaches the sludge digestion tank of the preliminary clarification, not shown, the entire sludge of the installation will at the same time become more valuable for its use as agricultural fertilizer.

In this manner, sewage obtained in large quantities, will be purified with simple means and without secondary settling tank fully biologically and with considerably greater load capacity of the filler material, than in the case of conventional biofilter installations.

Beyond that, it is also possible to provide the filterbiofilter for the purification of harmful exhaust air, so that the blower or the condensor 11 blows the exhaust air or exhaust gases below the container grate 3 and that the biofilter is wetted down from time to time with the help of the pump 17 and of the rotary distributor 8, so that the air above the forming biological sludge or the absorbed suspended substances is purified.

We claim:

1. A filter-biofilter for purifying sewage comprising, a container having granular filler material therein, said filler material having a specific grain weight of about 1 and a grain size of less than 6 mm, a rotary distributor having a distributor arm for the even distribution of preliminary clarified sewage above the filler material, a drainage arrangement for purified sewage having a flow-through the filler material, a pipe discharging below a perforated bottom grate for artificial aeration of the filler material, said grate having openings so dimensioned as to permit passage of a sludge/water mixture therethrough while preventing passage of the filler material grains therethrough, whereby the container for the biofilter is of a tight construction, is open at is top and is provided with a means for its being refilled with water for a turning over of a mixture of dammed up water, filler material and sludge by means of compressed air within the container for the biofilter, said container also being provided with a drainage arrangement for the excess sludge and rinsing water which is disposed in the upper layers of the filler material, whereby the means for turning-over of the above mentioned mixture above the perforated bottom grate comprises compressed air pipes leading into the filler material for the supply of air for turning-over the material being under higher pressure than the air for artificial aeration, characterized in that the sludge draining arrangement comprises at least one sludge removing arm having suction pipes thereon extending into the filler material, said arm being mounted for rotation in a horizontal plane, and being mounted above the filler material centrally in the container for the biofilter, said arm being connected with a drain pipe for the excess sludge and having containers on said suction pipes projecting into the upper layers of the filler material for the removal of sludge, means for effecting a suction effect through said suction pipes, and the turning-over means further comprises at least one rinsing arm mounted for rotation in a horizontal plane and being mounted centrally in the container for the biofilter, likewise above the filler material, said rinsing arm being connected with a source of compressed air for the turning-over process, and further having rinsing pipes thereon provided at their lower ends with air exit openings and extending into the filler material, whereby the turning-over and the sludge removal takes place in a horizontal direction as said sludge removing arm and said rinsing arm are rotated through the contents of the filter-biofilter.

2. A filter-biofilter as set forth in claim 1, wherein the sludge removing arm and the rinsing arm extend from a central pivot bearing over half the diameter of the container for the biofilter.

3. A filter-biofilter as set forth in claim 1 wherein the rinsing pipes of the rinsing arm extend downwardly to just above the perforated bottom grate.

4. A filter-biofilter as set forth in claim 1 wherein the rinsing pipes of the rinsing arm extend downwardly to about half the height of the filler material.

5. A filter-biofilter as set forth in claim 1 wherein the mutual distance of the rinsing pipes is held as great as the mutual distance of the containers for sludge removal.

6. A filter-biofilter as set forth in claim 1 wherein the suction pipes extending downwardly from the sludge removal arm have entry openings at their lower ends for the sludge discharge into the containers for sludge removal.

7. A filter-biofilter as set forth in claim 1 wherein the containers for sludge removal are in the form of pockets and are provided with perforated walls.

8. A filter-biofilter as set forth in claim 1 wherein the sludge removing arm and the rinsing arm are disposed below the distributor arm of the rotary distributor which has a supply pipe for the preliminary clarified sewage.

9. A filter-biofilter as set forth in claim 8 wherein a metering arrangement for the adding of for example a lime slurry, an aluminum sulfate, an activated carbon of a fine grain, is provided in the supply pipe.

10. A filter--biofilter as set forth in claim 1, characterized in that the sludge removing arm and the rinsing arm extend from a central pivot bearing over the entire diameter of the container for the biofilter.

11. A filter-biofilter as set forth in claim 10 wherein the rinsing pipes of one half the rinsing arm outwardly of the pivot bearing extend downwardly to closely above the perforated bottom grate, and the rinsing pipes of the other half of the rinsing arm extend downwardly to about half the height of the filler material.

12. A filter-biofilter as set forth in claim 1 wherein an electric motor is provided for operatively driving the sludge removing arm and the rinsing arm.

13. A filter-biofilter as set forth in claim 12 wherein current supply cables for the electric motor are also disposed within the central shaft.

14. A filter-biofilter as set forth in claim 1 wherein the sludge removing arm is disposed above the rinsing arm and both said arms are securely interconnected and are mounted for rotation about vertical concentric pipes by means of a ball-swivel connection located on a central shaft disposed in the container for the biofilter and housing said pipes, whereby said pipes are sealed against each other by means of slip ring seals and the inner one of said pipes is a discharge pipe for the sludge-water mixture connected with the sludge removing arm, and the outer one of said pipes is a supply pipe for high pressure air coming from the source of compressed air, and is connected with the rinsing arm.

15. A filter-biofilter as set forth in claim 14 wherein the drain pipe for the slude--water mixture is connected with the suction effect means which includes a vacuum pump.

* * * * *